Jan. 25, 1955 J. A. JENSEN 2,700,559
CONDUIT COUPLING WITH PIVOTED LATCH RETAINING MEANS
Filed June 13, 1950 2 Sheets-Sheet 2
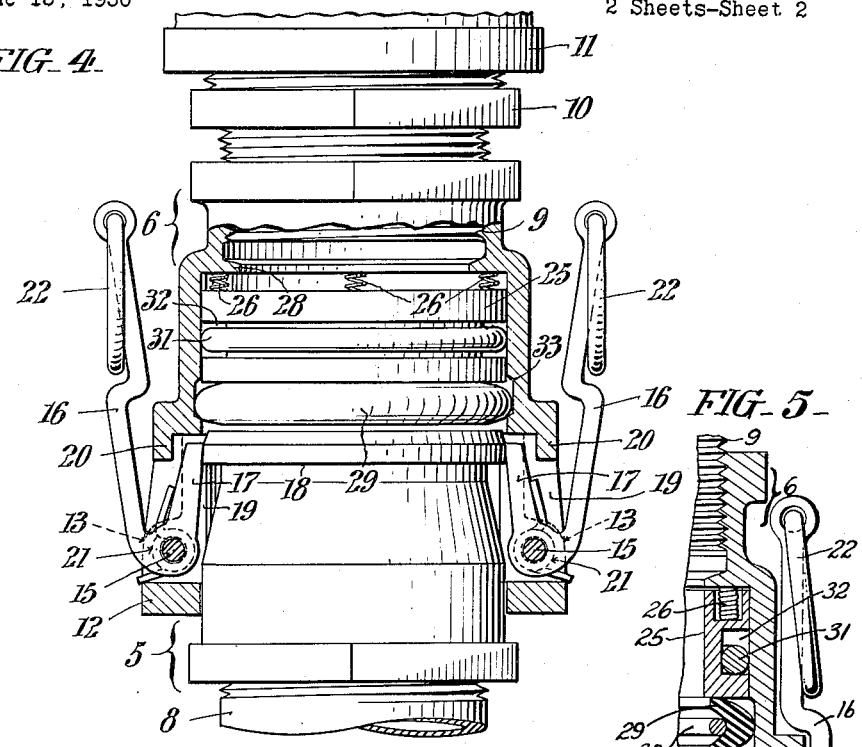
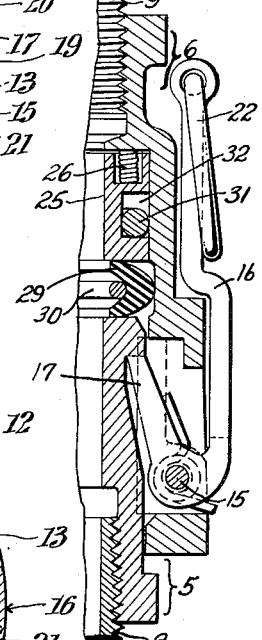
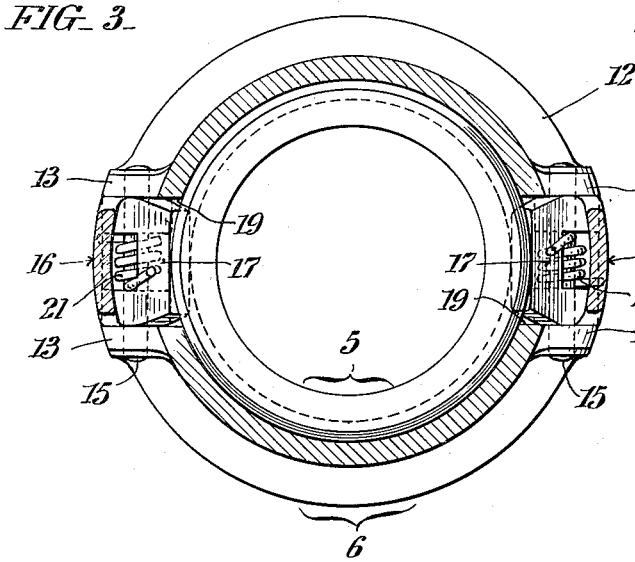
INVENTOR:
James A. Jensen,
BY Paul & Paul
ATTORNEYS.

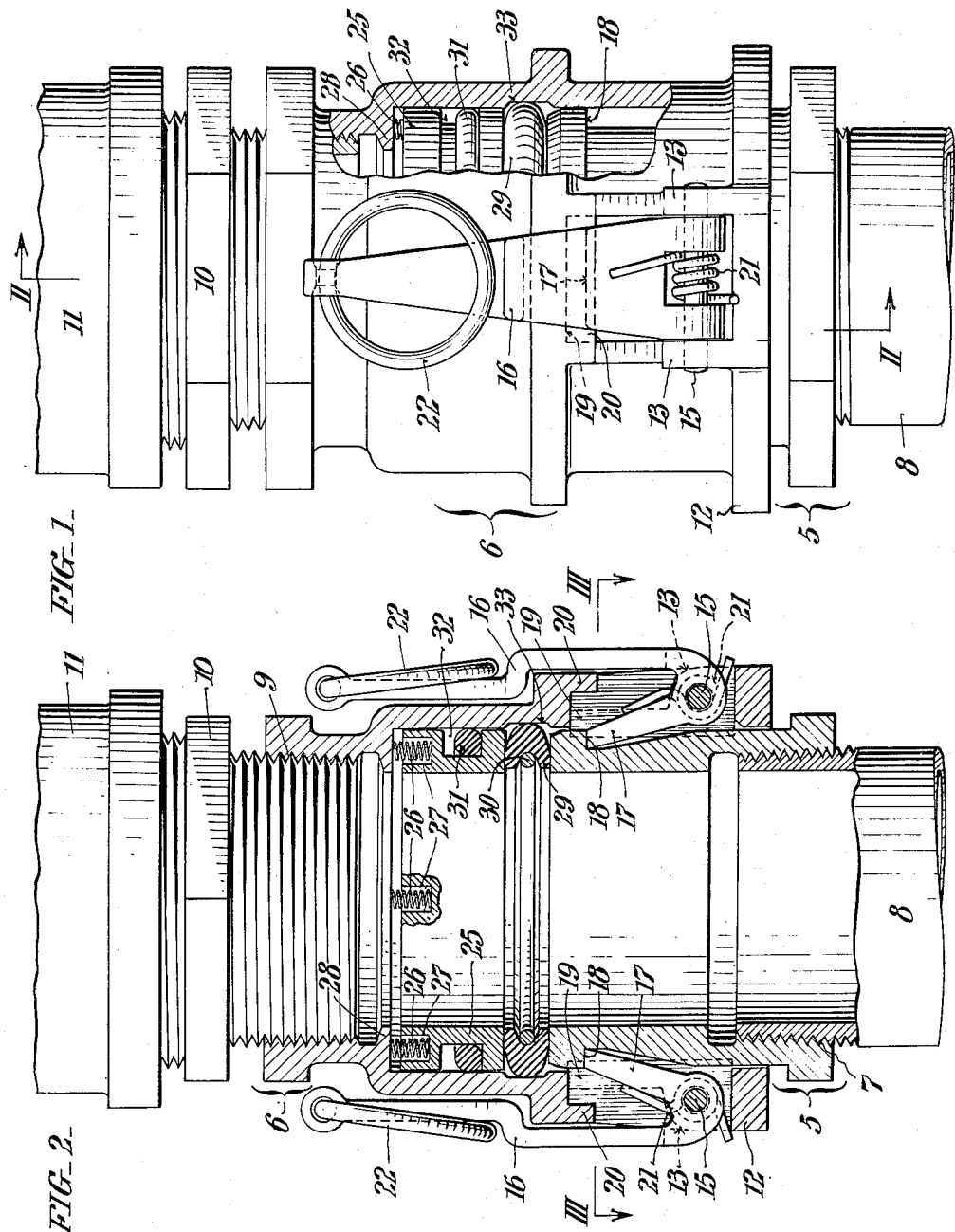

United States Patent Office 2,700,559
Patented Jan. 25, 1955

2,700,559

CONDUIT COUPLING WITH PIVOTED LATCH RETAINING MEANS

James A. Jensen, Haverford, Pa., assignor to Philadelphia Valve Company, Philadelphia, Pa., a corporation of Pennsylvania Application June 13, 1950, Serial No. 167,767

5 Claims. (Cl. 285—173)

This invention relates to conduit couplings. More particularly, it is concerned with conduit couplings useful, for example, in attaching delivery hoses to pipes leading from supply sources of fluid commodities such as gasoline, propane, etc. under pressure.

The chief aim of my invention is to provide a conduit coupling which is simple in construction and sturdy for ability to withstand rough usage; of which the mating components permit quick and ready connection and disconnection; and which is responsive to the pressure of fluid passing through it for maintenance of fluid tightness under all conditions.

Other objects and attendant advantages will appear from the following detailed description of the attached drawings, wherein Fig. 1 is a fragmentary view, partly in elevation and partly in axial section, of a conduit coupling conveniently embodying my invention.

Fig. 2 is an axial section taken as indicated by the angled arrows II—II in Fig. 1.

Fig. 3 is a cross section taken as indicated by the angled arrows III—III in Fig. 2.

Fig. 4 is a view like Fig. 1 showing how the mating components of the coupling are connected or disconnected; and Fig. 5 is a fragmentary view in section corresponding to Fig. 2 with the parts, by which fluid sealing is effected, shown in the positions which they occupy when the two components of the coupling are initially connected and prior to passage of fluid under pressure through the coupling.

In the form herein shown exemplified, my improved quick coupling comprises a pair of axially inter-fitting tubular male and female components 5 and 6, one end of the former having internal threads 7 for connection to a pipe 8 leading from a source of liquid or gas supply, and the latter being likewise internally threaded at one end, as at 9, for screw engagement by the nipple 10 at the corresponding end of a delivery hose 11 or other conduit. The component 6, it will be noted, has a bell end portion for engaging the mouth end of component 5, and is provided with a circumferential terminal flange 12 with pairs of laterally spaced ears 13 upstanding therefrom at diametrically opposite points. Pivoted on pins 15 extending crosswise between the ears 13, are latch levers 16 with pawl-like fingers 17 adapted to engage a circumferential shoulder 18 around the circumferentially beveled mouth end of component 5 from beneath, and thereby lock the parts in assembled relation, said fingers being movable through clearance openings 19 in said component and limited in their outward swing by the stop lugs indicated at 20. The latch levers 16 are yieldingly urged inward by torsion springs 21, and, at their distal ends, are provided with finger grasp rings 22. Axially within the mouth or bell portion of component 6 is a tubular piston element 25 as shown, piston element is urged downwardly by a plurality of springs 26 in compression between the bottoms of retaining sockets 27 in said element, and a circumferential shoulder 28 internally of said component 6. Normally, the lever extensions 16 of the latch fingers 17 lie flat against the side of the component 6 as shown in Fig. 2 so as to be out of the way. An internally grooved horizontal gasket 29 of rubber or other resilient material having a V-shaped cross section, the V being normally expanded as in Fig. 5 with its legs extending inwardly toward the axis of the coupling. The gasket 29 is reinforced from within by a ring 30 of metal, and is provided to serve as a fluid seal between the mouth end of component 5 and the contiguous end of the piston element 25; while a round section packing ring 31 of similar material lodged in a groove 32 around the piston element, is relied upon for maintenance of a fluid tight seal with the inner surface of the bell end of component 6. As shown, gasket 29 circumferentially engages into a groove 33 internally of the component 6 and thus acts in the additional capacity as a means for normally retaining the piston element within the bell end of said component with the springs 26 substantially relaxed. It is to be further noted that the bores of the component 5 and of the piston element 25 are made to correspond in diameter to those of the pipe 8 and the hose nipple 10, with consequent avoidance of any obstructions such as would be likely to impede fluid flow through the coupling.

Operation

To connect the coupling, the bell component 6 is simply engaged downwardly over the component 5 incident to which the latch fingers 17 are momentarily displaced outward through camming action with the bevel around the mouth of the latter component. Eventually the latch fingers 17 are thrust beneath the annular shoulder 18 of the component 5 by the springs 21, with attendant upward retreat of the spring-biased piston element 25 and slight compression of the gasket 29 as in Fig. 5. From the latter illustration, it is to be observed that upon initial assembling of the coupling, part of the bottom area of the V section gasket 29 is in contact with the top surface of the male component 5. The remaining portion of the bottom area of the gasket 29 is exposed to the outside atmosphere from beneath by way of the annular clearance between the male component 5 and the bell portion of the female component 6, while the full and larger top area of the piston element 25 is exposed to the pressure of the fluid passing through the coupling. A differential therefore exists between the area of the gasket 29 exposed to the atmosphere and that of the piston element 25 exposed to the passing fluid. As a consequence of the force exerted upon the piston element 25 by the pressure of the passing fluid, the gasket 29 will be squeezed and distorted cross-sectionally somewhat to substantially fill the annular interval between said element and the contiguous end face of component 5. The fluid passing under pressure will also cause the gasket 31 to be displaced downward in the groove 32 and to be likewise cross sectionally distorted somewhat for maintenance of a fluid tight seal with the inner circumferential surface of the bell component 6. It therefore follows that the resistivity of the seals will increase in direct proportion to increase in the pressure of the passing fluid, with consequent assurance against leakage of the coupling under all conditions likely to be met with in practice. Disconnection of the coupling is accomplished simply by retraction of the latch fingers 17 first through lateral pull on the grasp rings 22 to release the component 6, and then, while said rings are still grasped, lifting said component away from the component 5 in a manner readily understood from Figs. 2 and 4. Both connection and disconnection of the coupling are thus accomplished quickly and easily with minimum exertion.

Having thus described my invention I claim:

1. In a coupling of the character described, tubular male and female components secured respectively to corresponding ends of two conduits to be connected, the female component having a bell portion telescopically engageable over the mouth end of the male component and an annular shoulder internally of said bell portion; a normally-spread internally-grooved ring gasket of resilient material V-shaped in cross section within the bell of the female component with the legs of the V extending inwardly toward the axis of the coupling; an annular backing piston element positioned behind the ring gasket within the bell of the female component and having a circumferential groove; a round section packing ring lodged in the groove of the piston element for maintaining a fluid tight seal within the internal or bore surface of the bell portion of the female component; yielding means in compression between the piston element and the annular shoulder within the bell of the female component; and retractible means for locking the two components together in initially assembled relation, with the piston element partially depressed against the resistance of the yielding means, and with the opposite side faces of the ring gasket in partial areal engagement with the confronting end faces of the male component and of the piston element.

2. A conduit coupling according to claim 1, wherein the male component has an external circumferential shoulder around its mouth end, wherein the locking means includes a plurality of inwardly spring-biased latch fingers individually pivoted on the female component and disposed within clearance openings in the latter to engage behind the external circumferential shoulder around the mouth end of the male component, and wherein said latch fingers are provided with actuating levers which extend in the same general direction as the fingers and which lie flat against the coupling when the fingers are in locking position.

3. A conduit coupling according to claim 1, wherein the male component has an external circumferential shoulder around its mouth end, wherein the locking means includes a plurality of inwardly spring-biased latch fingers individually pivoted on the female component and disposed within clearance openings in the latter to engage behind the circumferential shoulder around the mouth end of the male component, wherein said latch fingers are provided with actuating levers which extend in the same general direction as the fingers and which lie flat against the coupling when the fingers are in locking position, and wherein stops on the female component cooperate with the latch fingers during retraction of the latter to limit outward swing of the lever extensions.

4. In a coupling of the character described, tubular male and female components secured respectively to corresponding ends of two conduits to be connected, the male coupling having a circumferential stop shoulder about its mouth end, and the female component having a bell portion to engage telescopically over the mouth end of the male component; and locking means including a pair of latch fingers fulcrumed about pivots respectively within diametral clearance openings in the bell portion of the female component adjacent its mouth end and adapted to engage behind the circumferential stop shoulder aforesaid around the telescoped mouth end of the male component, said latch fingers being formed with actuating lever extensions which extend in the same general direction from the pivots and which normally lie in close parallel relationship to the bell portion of the female component, and spring means operative to yieldingly maintain the latch fingers pressed inwardly in locking position.

5. A conduit coupling according to claim 4, wherein the actuating lever extensions of the latch fingers are provided at their distal ends with swingably-connected grasp rings.

References Cited in the file of this patent

UNITED STATES PATENTS

| Number | Name | Date |
| --- | --- | --- |
| 593,191 | Bernhardt | Nov. 9, 1897 |
| 621,276 | Paul | Mar. 14, 1899 |
| 1,253,309 | Ulleland | Jan. 15, 1918 |
| 1,265,488 | Nolan | May 7, 1918 |
| 1,366,634 | Clark | Jan. 25, 1921 |
| 1,903,445 | Ernst | Apr. 11, 1933 |
| 2,434,684 | Casperson | Jan. 20, 1948 |
| 2,461,705 | Stranberg | Feb. 15, 1949 |
| 2,511,386 | Warren | June 13, 1950 |
| 2,652,895 | Arrowood | Sept. 22, 1953 |